Dec. 11, 1934.  C. B. SPASE  1,983,885
CLUTCH CONSTRUCTION
Filed July 29, 1931
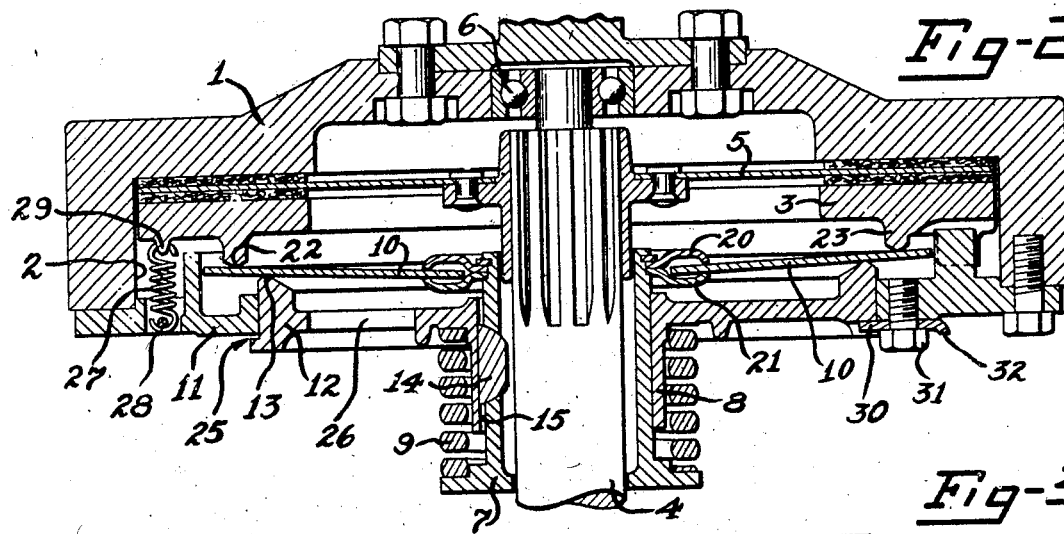
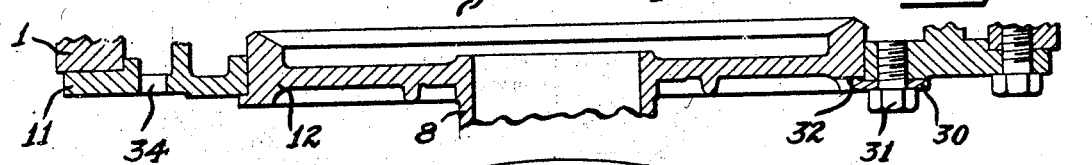
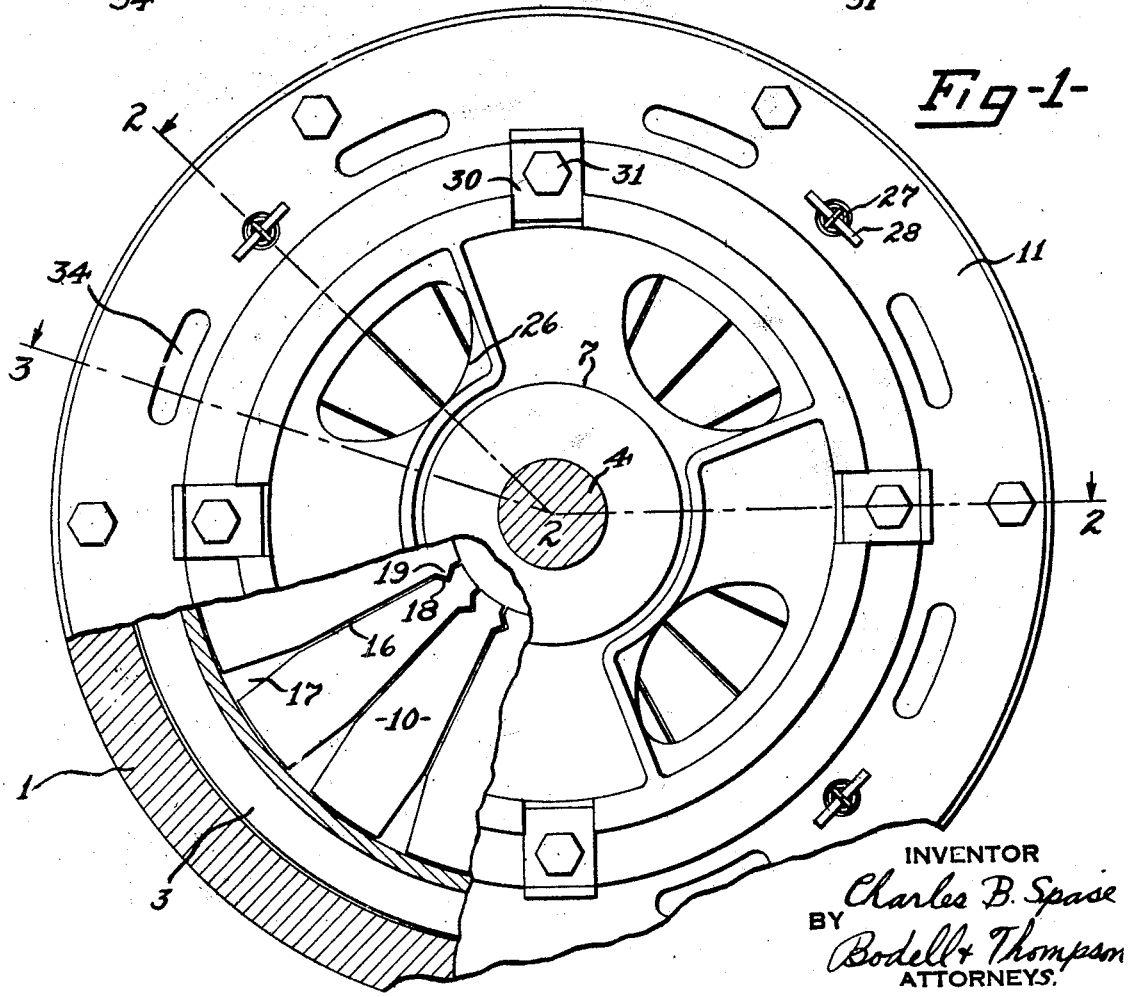
INVENTOR
Charles B. Spase
BY
Bodell + Thompson
ATTORNEYS.

Patented Dec. 11, 1934

1,983,885

UNITED STATES PATENT OFFICE 1,983,885

CLUTCH CONSTRUCTION

Charles B. Spase, Syracuse, N. Y., assignor to W. C. Lipe Inc., Syracuse, N. Y., a corporation of New York Application July 29, 1931, Serial No. 553,745

14 Claims. (Cl. 192—68)

This invention relates to friction clutches, such as are used in motor vehicles and particularly, clutches embodying a series of motion transmitting and multiplying levers between the throwout collar and the pressure ring, and has for its object, a particularly simple and efficient means self contained with the clutch for synchronizing the speed of the driving element or fly wheel of the engine and the driven element or clutch shaft and the countershaft of a transmission gearing connected thereto prior to gear shifting operations, or during gear shifting operations, so that the gears will tend to come into mesh without clashing and without any conscious or deliberate effort on the part of the driver to avoid clashing. The term gear shifting is intended to comprehend both shiftable gears and shiftable toothed clutches, and either jaw clutches or gear clutches.

It further has for its object, a particularly simple and efficient lever construction by which the levers are held assembled by interlocking means between them before the clutch is assembled in a fly wheel, or driving element.

It further has for its object, a particularly simple and efficient arrangement and adjustment of the fulcrum ring for the motion transmitting and multiplying levers.

It further has for its object, a particularly simple and efficient ventilating means for the clutch.

The invention consists in the novel features and in the combinations and constructions hereinafter set forth and claimed.

In describing this invention, reference is had to the accompanying drawing in which like characters designate corresponding parts in all the views.

Figure 1 is a rear elevation, partly in section, of a clutch embodying this invention.

Figure 2 is a sectional view on line 2—2—2, Figure 1.

Figure 3 is a fragmentary sectional view similar to Figure 2 illustrating the final adjustment of the abutment disk and taken on line 2—2—3, Figure 1.

This clutch comprises generally, driving and driven elements, the driving element being usually the fly wheel of the internal combustion engine of the vehicle, a pressure ring opposed to a friction surface formed at the bottom of a recess in the driving element or fly wheel, a back cover structure rotatable with the driving element and closing the rear end of the recess, the driven element comprising a shaft and a friction plate or disk mounted thereon and extending between the pressure ring and the bottom of the recess of the fly-wheel, a throw-out sleeve slidable axially of the shaft, a spring acting thereon to hold the clutch engaged, and motion transmitting levers between the throw-out sleeve and the pressure ring, the clutch spring being interposed between a collar on the rear end of the throw-out sleeve and a fulcrum ring for said levers, which fulcrum ring is adjustable axially rectilinearly as distinguished from a screw thread adjustment, and is also slidable within limits during the operation of the throw-out sleeve.

In clutches used in motor vehicles, the shiftable element of the clutch is usually the driven element.

The transmission gearing for which this clutch is particularly applicable is either of the sliding gear type or the constant mesh type with slidable clutches. The transmission gearing includes a drive shaft, which is shaft 4, a transmission shaft, a countershaft and the gearing between the shafts. In heavy duty transmission gearings, the countershaft and the gears thereon are heavy and have considerable fly wheel momentum which causes the gears to spin when the clutch is disengaged so that the gear elements to be meshed during the gear shifting operation must be synchronized in order to avoid clashing during gear shifting operations.

In shifting from a lower to a higher speed the usual procedure is to release the clutch and decelerate the engine. This procedure leaves the driven element rotating at approximately the same high speed as the engine before deceleration. Therefore, the countershaft of the transmission which is directly coupled to the driven element is revolved at much too high a speed to permit easy shifting into a higher speed. It being understood that in shifting from a lower speed to a higher speed, synchronism is obtained only through a slowing down of the transmission countershaft. In some clutches this is effected by having a clutch brake which unfortunately usually slows down the countershaft speed too much or stops it entirely. Since the vehicle speed controls the mainshaft speeds of the transmission, such an artifice as a clutch brake usually does not attain the purpose of its function, causing gear clash, etc.

The known tendency in shifting from a higher speed to a lower speed is to accelerate the engine. This is done to increase the countershaft speed which is necessary to obtain a synchronous condition. Hence in shifting from a higher to a lower gear the operator should accelerate the engine while the clutch is engaged and the transmission gear in neutral and then release the clutch and complete the gear shifting operation, the accelerating of the engine while the transmission gear is in neutral bringing the gears that are to be engaged into a synchronous relation. It often happens that the operator overlaps the operation of accelerating and throwing out the clutch or does both simultaneously or starts to release the clutch before the engine is accelerated so that the intended accelerated speed of the engine is not transferred to the transmission and the synchronous condition not established.

Some drivers intuitively operate the clutch with what is called a double declutching effect, while others never acquire the knack of "double declutching", and one of the objects of this invention is a mechanism built into the clutch for automatically effecting the declutching in two steps upon one throw of the clutch pedal in contradistinction to effecting double declutching by deliberate and skillful operation of the pedal with a plurality of movements.

1 designates the driving element, which may be the fly wheel of the internal combustion engine of the vehicle, the fly wheel having a recess 2 in its rear face.

3 is the pressure ring mounted in the recess and interlocked with the fly wheel to rotate therewith and shift axially thereof. The driven element includes a shaft 4 having a friction plate or disk 5 mounted thereon in the recess and extending between opposing surfaces of the pressure ring 3 and the fly wheel 1, the surface on the fly wheel 1 being the bottom of the recess 2. The shaft has the usual pilot bearing 6 in the driving element or fly wheel 1, and as will be understood by those skilled in the art, is connected to the transmission gearing of the vehicle, the shaft 4 being usually the stem of the stem gear of the transmission gearing.

7 is the throw-out sleeve slidable axially of the shaft 4 in the hub 8 of the back cover structure of the clutch. 9 is the clutch spring acting on the throw-out sleeve, and 10 are a series of radially extending motion transmitting and multiplying levers between the inner end of the throw-out sleeve 7 and the pressure ring 3. The levers are rigid or inflexible.

The back cover structure comprises an annular back plate 11 bolted or otherwise secured to the fly wheel, and an adjustable fulcrum disk 12 slidable in the annular back plate 11 and carrying an annular fulcrum 13 on which the levers 10 are fulcrumed. This fulcrum disk is provided with the hub 8 in which the throw-out sleeve 7 is mounted and the hub 8 is keyed to the sleeve 7 to rotate therewith but slide axially thereof by a key member 14 provided on the sleeve and sliding in a lengthwise groove 15 in the hub 8.

The throw-out sleeve is operated in the usual manner by the clutch pedal and rocking yoke, not shown, thrusting against the end of the sleeve 7.

The levers 10 are segments of a discoidal plate abutting at their side edges against each other as at 16, and being provided with ventilating openings or notches 17 at their outer ends, the notches being formed partly in adjacent levers. That is, they are preferably formed between the outer ends of the levers. The levers are held from displacement relatively to each other by interlocking means here shown as notches 18 formed in like edges of the levers for receiving complemental projections 19 formed on the adjacent levers, these notches and projections being preferably triangular and located near the inner ends of the levers. The extreme inner ends of the levers are located in a groove provided at the inner end of the throw-out sleeve 7. This groove is formed by a collar formed of opposing sections 20 and 21, the open side of the groove being contracted so that both sections 20 and 21 engage the levers 10 at the entrance of the groove.

The projections 19 and notches 18 hold the levers assembled or from displacement while the clutch is being assembled in the fly wheel. Heretofore, this function has been performed by providing the inner ends of the levers with angular flanges or hooks within the groove of the collar sections corresponding to the sections 20 and 21. The projections 18 and 19 are more economical to manufacture and more efficient than hooks provided at the inner ends of the levers.

The outer ends of the levers press against an angular bearing face 22 provided at the outer edge of a rib 23 on the rear side of the pressure plate 3, the bearing face 22 being preferably rounded. The declutching effect in two steps continuous of each other is brought about by slidably mounting the fulcrum disk 12 in the back plate 11 so that it has a limited sliding movement axially relatively to the shaft 4 and the levers 10 during the clutching and declutching operations. The sliding movement is about one thirty-second of an inch and is indicated at 25 by the space between an annular flange on the fulcrum disk 12 and the rear face of the back plate 11. The fulcrum disk 12 is provided with ventilating openings 26 through which air is taken during the rotation of the disk and thrown out through openings 34 formed in the back plate 11, the current of air passing radially against the levers 10 and around the ends thereof against the pressure plate and out through the openings, thus cooling these parts which become heated and warped by slipping action of the clutch. The notches 17 not only provide ventilating passages, but also narrow the outer ends of the levers to minimize any lateral rocking effect of the levers and the application of pressure unequally by the levers throughout the width thereof.

During the declutching operation, the pressure ring 3 is withdrawn by a suitable number of springs 27 connected at like ends to the back plate at 28 and at their other ends at 29 to the pressure plate.

In the operation thus far described, when the throwout sleeve 7 is operated against the action of the spring 9, the inner ends of the levers partake of the full movement of the throw-out sleeve and during the first part of the throw-out movement of the sleeve 7, and spring 9 compresses slightly relatively to the fulcrum disk 12 so that the inner ends of the levers have a greater and different movement during the initial compression of the spring 9 than the fulcrum disk 12. During this movement, the driven element is partly released from the driving element because of the movement of the inner ends or long arms of the levers 10 inwardly, the outer or shorter arms are moved away from the bearing points 23 on the pressure ring 3, but not entirely out of engagement therewith until full compression of the spring 9 so that during the deceleration of the engine, the driving element or fly wheel 1 is still engaged with the friction disk 5 and holds disk 5 from spinning under the momentum of the countershaft of the gearing and gears thereon, and of the gears on the transmission shaft in mesh with the countershaft gears in constant mesh transmissions, and thus prevents spinning of the gears on the countershaft and of gears on the transmission shaft of a constant mesh gearing, faster than the transmission shaft which is now being turned by the coasting vehicle.

Also, as soon as the spring 9 begins to depress and hence, the driving effect taken off from the transmission gearing, the shiftable gear elements are released from driving effect and are free to be shifted, without binding, out of mesh or out of engagement with the gear elements with which they are engaged to neutral position.

During the completion of the throw-out movement of the sleeve 7, the fulcrum disk 12 moves in axially, taking up the one thirty-second of an inch clearance at 25, so that during such further or final movement of the sleeve, all pressure on the pressure ring 3 is quickly withdrawn and the pressure ring is free to be acted upon by the springs 27, and thereafter the shiftable elements of the gearing are shifted into their new shifted position with the speed of said elements synchronized. During the reengagement of the clutch, that is during the release of the throw-out sleeve 7, the spring 9 reacts but does not at first apply full pressure to the pressure ring through the levers 10. Full pressure is not applied until the fulcrum ring 12 has been shifted rearward to restore the clearance at 25. The action results in a natural, smooth engagement of the clutch.

During each shifting operation from a lower gear to a higher gear, the clutch goes through a sequence of operations as follows:

a. As the clutch pedal is depressed the clutch levers are unloaded from the spring.

b. It follows that the gears are almost entirely unloaded from the drive of the engine and are therefore shiftable.

c. The clutch sleeve 7, spring 9, levers 10 and fulcrum ring 12 then move approximately one thirty-second of an inch without moving the pressure plate 3 while the engine is declerating thus causing the slowing down of the driven element 5.

d. After the one thirty-second of an inch movement occurs, the further movement of the clutch pedal fully releases the pressure plate 3 from engagement with the driven element 5.

As a result of this combination of events, the countershaft is slowed down to approximately the correct speed for a clean changing of gears.

In shifting from a higher to a lower gear, the clutch pedal is depressed. The period before full release is long enough to cause the acceleration of the engine to also accelerate the driven element since the driven element is in partial contact with the driving element during part of the declutching operation and thus insures a better condition for the change of gears.

In new clutches, the clearance at 25 is of greater importance than when the clutch is well worn in, and after the clutch becomes well worn in, an adjustment to prevent slipping in the normal operation is necessary. The fulcrum ring is adjusted to its innermost position wherein the clearance at 25 is entirely taken up. The fulcrum disk 12 is normally held with the clearance 25 provided between it and the back plate 11 by means of plates 30 interposed between the heads of screws 31 and the back plate 11, and the margins of the adjusting plate 30 overlying the outer face of the margin of the disk 12, as seen in Figure 2. However, when adjustment of the clutch is necessary to take up wear, the adjustment plates 30 are reversed into the position shown in Figure 3 wherein lips or thickened portions 32 are arranged to engage the rear face of the fulcrum disk 12 so as to hold the disk 12 in its innermost position with no clearance left at 25. This provides a particularly simple adjustment that can be made quickly by any mechanic and also provides for accurate rectilinear adjustment of the disk 12 in contradistinction to a screw thread or inclined plane adjustment. Also, this adjustment maintains the parallelism of the fulcrum 13 and the levers, which parallelism can not be maintained by the screw thread adjustment or connections wherein the abutment ring is adjusted by screwing it in the back plate.

When such an adjustment is necessary, the clutch is well worn in and gear shifting operations easy, compared with such operations when using a new clutch and also, when such adjustment is necessary, the friction faces of the disk 5 are about ready to be renewed although when slipping of the clutch develops, the adjustment can be readily made by the operator or an ordinary mechanic, a wrench being the only tool needed.

The action and relative arrangement of the levers 10 with respect to the fulcrum plane forms no part of this invention and cross reference is made to my application Ser. No. 602,888, filed April 4, 1932.

What I claim is:

1. In a clutch, the combination of driving and driven elements, a pressure ring rotatable with and shiftable axially of one of said elements, the other of said elements including a friction plate extending between the pressure ring and the opposing surface of the element with which the ring is associated, an axially shiftable throw-out sleeve, motion transmitting and multiplying levers between the throw-out sleeve and the pressure ring, a back plate secured to the element with which the pressure ring is associated, a fulcrum ring mounted in the back plate for coacting with said levers, and a clutch spring interposed between the throw-out collar and the fulcrum ring.

2. In a clutch, the combination of driving and driven elements, a pressure ring rotatable with and shiftable axially of one of said elements, the other of said elements including a friction plate extending between the pressure ring and the opposing surface of the element with which the ring is associated, an axially shiftable throw-out sleeve, motion transmitting and multiplying levers between the throw-out sleeve and the pressure ring, a back plate secured to the element with which the pressure ring is associated, a fulcrum ring mounted in the back plate for coacting with said levers, and a clutch spring interposed between the throw-out collar and the fulcrum ring, the fulcrum ring being mounted to have a limited axial sliding movement.

3. In a clutch, the combination of driving and driven elements, a pressure ring rotatable with and shiftable axially of one of said elements, the other of said elements including a friction plate extending between the pressure ring and the opposing surface of the element with which the ring is associated, an axially shiftable throw-out sleeve, motion transmitting and multiplying levers between the throw-out sleeve and the pressure ring, a back plate secured to the element with which the pressure ring is associated, a fulcrum ring mounted in the back plate for coacting with said levers, and a clutch spring interposed between the throw-out collar and the fulcrum ring, and means for adjusting the fulcrum ring rectilinearly axially relatively to the back plate and the throw-out collar.

4. In a clutch, the combination of driving and driven elements, a pressure ring rotatable with and opposed to the driving element, the driven element including a shaft and a friction plate thereon extending between the pressure ring and the opposing surface of the driving element, a back plate carried by the driving element, a fulcrum disk mounted in the back plate to shift axially thereof, a throw-out sleeve mounted concentric with the shaft and slidable axially of the shaft and the fulcrum disk and extending to the rear of the disk, a spring encircling the sleeve and thrusting at its rear end against said sleeve and at its front end against the fulcrum disk, motion transmitting and multiplying levers between the throw-out sleeve and the pressure ring, said levers coacting with the fulcrum disk.

5. In a clutch, the combination of driving and driven elements, a pressure ring rotatable with and opposed to the driving element, the driven element including a shaft and a friction plate thereon extending between the pressure ring and the opposing surface of the driving element, a back plate carried by the driving element, a fulcrum disk mounted in the back plate to shift axially thereof, a throw-out sleeve mounted concentric with the shaft and slidable axially of the shaft and the fulcrum disk and extending to the rear of the disk, a spring encircling the sleeve and thrusting at its rear end against said sleeve and at its front end against the fulcrum disk, motion transmitting and multiplying levers between the throw-out sleeve and the pressure ring, said levers coacting with the fulcrum disk, the fulcrum disk being mounted to have a limited sliding movement in the back plate.

6. In a clutch, the combination of driving and driven elements, a pressure ring rotatable with one of said elements, a back plate rotatable with the element with which the pressure ring is associated, the other element comprising a shaft and a friction plate on the shaft extending between the pressure ring and the opposing surface of the element with which the pressure ring is associated, a throw-out sleeve shiftable axially of the shaft, a clutch spring acting on the throw-out sleeve to hold the clutch engaged, and motion transmitting and multiplying levers between the throw-out sleeve and the pressure ring, said levers being separate units which are arranged side by side and each being provided with means interlocking with the adjacent lever to hold the levers assembled.

7. In a clutch, the combination of driving and driven elements, a pressure ring rotatable with one of said elements, a back plate rotatable with the element with which the pressure ring is associated, the other element comprising a shaft and a friction plate on the shaft extending between the pressure ring and the opposing surface of the element with which the pressure ring is associated, a throw-out sleeve shiftable axially of the shaft, a clutch spring acting on the throw-out sleeve to hold the clutch engaged, and motion transmitting and multiplying levers between the throw-out sleeve and the pressure ring, said levers being arranged side by side and each being provided with a notch in one edge, and a projection on its other edge, the notch of one lever being arranged to receive the projection of the adjacent lever.

8. In a clutch, the combination of driving and driven elements, a pressure ring opposed to the driving element, a back cover structure rotatable with the driving element, the driven element comprising a shaft, and a friction disk thereon interposed between the pressure ring and the driving element, a throw-out sleeve shiftable axially of the shaft, a clutch spring acting thereon to hold the clutch engaged, motion transmitting levers interposed between the sleeve and the pressure ring, the back cover structure having a fulcrum for said levers, and the pressure ring also having a pressure surface for the levers, the levers being segments of a discoidal plate and having their side edges engaged toward the shaft and provided with openings between them at their outer ends, the back cover structure being formed with a series of ventilating openings located toward the shaft and with an outer series of ventilating openings located near the outer edge of the back cover structure, whereby during the rotation of the clutch air is free to pass through the inner series of openings against the levers through the openings at the outer ends of the levers against the pressure ring and out through the outer series of openings.

9. In a clutch comprising a back plate and an annular member carried by the back plate and adjustable axially thereof to take up for wear, of means for adjusting the plate comprising reversible washers, and means for clamping the washers against the back plate, the washers having opposite edge portions of different thicknesses, the washers being reversible to bring either of said portions against the annular member.

10. In a clutch, the combination of driving and driven elements, a pressure ring rotatable with and opposed to the driving element, the driven element including a shaft and a friction disk extending between the pressure ring and the driving element, a throw-out sleeve shiftable axially of the shaft, and motion transmitting and multiplying levers between the throw-out sleeve and the pressure ring, a spring acting on the throw-out sleeve to hold the clutch engaged, and means for successively releasing the pressure ring of the spring load, whereby the driving element acts to synchronize the rotation of the driven element with the driving element, and then fully releasing the driven element upon one continuous throw of the throwout sleeve by the operator, by first applying light pressure to the pressure ring through the levers and then full pressure upon one continuous throw of the sleeve by the spring.

11. In a clutch, the combination of driving and driven elements, a pressure ring rotatable with and opposed to the driving element, the driven element including a shaft and a friction disk extending between the pressure ring and the driving element, a throw-out sleeve shiftable axially of the shaft, and motion transmitting and multiplying levers between the throwout sleeve and the pressure ring, a spring acting on the throwout sleeve to hold the clutch engaged, and means for successively releasing the pressure ring of the spring load, whereby the driving element acts to synchronize the rotation of the driven element with the driving element, and then fully releasing the driven element upon one continuous throw of the throwout sleeve by the operator, by first applying light pressure to the pressure ring through the levers and then full pressure upon one continuous throw of the sleeve by the spring, said means comprising a fulcrum disk for the levers rotatable with the driving element, the pressure ring and the levers and slidable axially relatively thereto, the throw-out spring thrusting at one end against the fulcrum ring in a direction opposite to the thrust of the sleeve by the spring against said levers, and shoulders for limiting the inward sliding of the fulcrum ring when the sleeve is operated to release the pressure ring.

12. In a clutch, the combination of driving and driven elements, a pressure ring rotatable with and shiftable axially of one of said elements, the other element including a friction plate extending between the pressure ring and the opposing surface of the element with which the ring is rotatable, an axially shiftable throw-out sleeve, motion transmitting and multiplying levers between the throw-out sleeve and the pressure ring, a back plate secured to the element with which the pressure ring is associated, and an axially shiftable spring pressed floating fulcrum ring mounted on the back plate for coacting with said levers and having a limited axial shifting movement against the action of the spring during the throwing-out operation and with the spring during the throwing-in operation.

13. In a clutch, the combination of driving and driven elements, a pressure ring rotatable with and shiftable axially of one of said elements, the other element including a shaft and friction plate, the latter extending between the pressure ring and the opposing surface of the element with which the ring is rotatable, a throw-out sleeve shiftable axially of the shaft, motion transmitting and multiplying levers between the throw-out sleeve and the pressure ring, a back plate secured to the element with which the pressure ring is associated, an axially slidable floating fulcrum ring mounted in the back plate for coacting with said levers, and a clutch spring acting in opposite directions on the throw-out collar and the fulcrum ring.

14. In a clutch, the combination of driving and driven elements, a pressure ring rotatable with and shiftable axially of the driving element, the driven element including a friction plate extending between the pressure ring and the opposing surface of the driving element, an axially shiftable throw-out sleeve, motion transmitting and multiplying levers between the throw-out sleeve and the pressure ring, a back plate secured to the driving element, a fulcrum ring coacting with the lever and mounted in the back plate to have an axial shifting movement, a clutch spring acting in opposite directions on the fulcrum ring and the throw-out sleeve, and springs connected to the pressure ring to withdraw the pressure ring in opposition to the action of the clutch spring, said levers being floatingly mounted and bearing on and separable from the pressure ring and the fulcrum ring.

CHARLES B. SPASE.